United States Patent [19]
Gasser

[11] 3,866,539
[45] Feb. 18, 1975

[54] WHEEL GUARD AND TRAVEL STOP ARRANGEMENT

[75] Inventor: William James Gasser, Long Grove, Ill.

[73] Assignee: Brite-O-Matic Manufacturing Inc., Arlington Heights, Ill.

[22] Filed: Oct. 1, 1973

[21] Appl. No.: 402,059

[52] U.S. Cl. .............................. 104/249, 104/279
[51] Int. Cl. ........................................ B61k 7/18
[58] Field of Search ............... 104/279, 249, 254; 213/220, 222; 238/131

[56] References Cited
UNITED STATES PATENTS

| | | | |
|---|---|---|---|
| 1,099,948 | 6/1914 | Stillman | 238/131 |
| 2,129,539 | 9/1938 | Steenstrup | 104/249 X |
| 2,737,125 | 3/1956 | Hayes | 104/249 X |
| 2,988,833 | 6/1961 | Preston | 104/279 X |

*Primary Examiner*—Lloyd L. King
*Assistant Examiner*—Randolph A. Reese
*Attorney, Agent, or Firm*—Hume, Clement, Brinks, Willian, Olds & Cook, Ltd.

[57] ABSTRACT

A wheel guard and travel stop arrangement for a car washing device or the like. A guard-wiper at each of four corners of the device's carriage cooperates with a respective track to wipe it clean. The guard-wipers in turn cooperate with minimum profile travel stops to limit carriage travel.

5 Claims, 3 Drawing Figures

PATENTED FEB 18 1975  3,866,539

WHEEL GUARD AND TRAVEL STOP ARRANGEMENT

FIELD OF THE INVENTION

This invention relates in general to vehicle washing devices. It relates particularly to safety equipment on an automatic vehicle washing device.

BACKGROUND OF THE INVENTION

There are numerous and widely varying automatic, semiautomatic and manual vehicle washing devices presently in use. Exemplary of one type of device is that illustrated in the Bevier U.S. Pat. No. 3,706,109. This type of vehicle washing device employs a movable carriage in the form of an arch which rolls on tracks bracketing an automobile, for example. An operator drives the carriage back and forth between opposite end stops on the tracks while brushes and spraying equipment clean the auto.

SUMMARY OF THE INVENTION

A primary object of this invention is to provide a new and improved wheel guard and travel stop arrangement for a car washing device or the like. Another object is to provide a wheel guard and travel stop arrangement which assures protection against a carriage wheel inadvertently running over an operator's foot, for example, or other foreign objects which might damage the device and/or the object. Still another object is to provide a simple and inexpensive wheel guard and travel stop arrangement of the aforedescribed arrangement. The track itself with the beveled end stops provides an extremely low profile which eliminates any blunt edges upon which to trip or damage automobile tires.

The foregoing and other objects are realized in accord with the invention by providing a unique guard or wiper on the carriage adjacent each of the four corners of the carriage in complimentary arrangement with the respective track on which the carriage rides. Each guard cooperates with the track to wipe the track clean and prevent any other foreign objects from being run over by the wheels of the carriage. The guards, in turn, cooperate with travel stops at the travel limit of the carriage on each track. As a result, the carriage can only move back and forth on the track between its opposite end travel stops.

BRIEF DESCRIPTION OF THE DRAWING

The invention, including its construction and method of operation, along with additional objects and advantages thereof, is illustrated more or less diagrammatically in the drawing, in which.

DESCRIPTION OF THE PREFERRED EMBODIMENT

Figure 1:
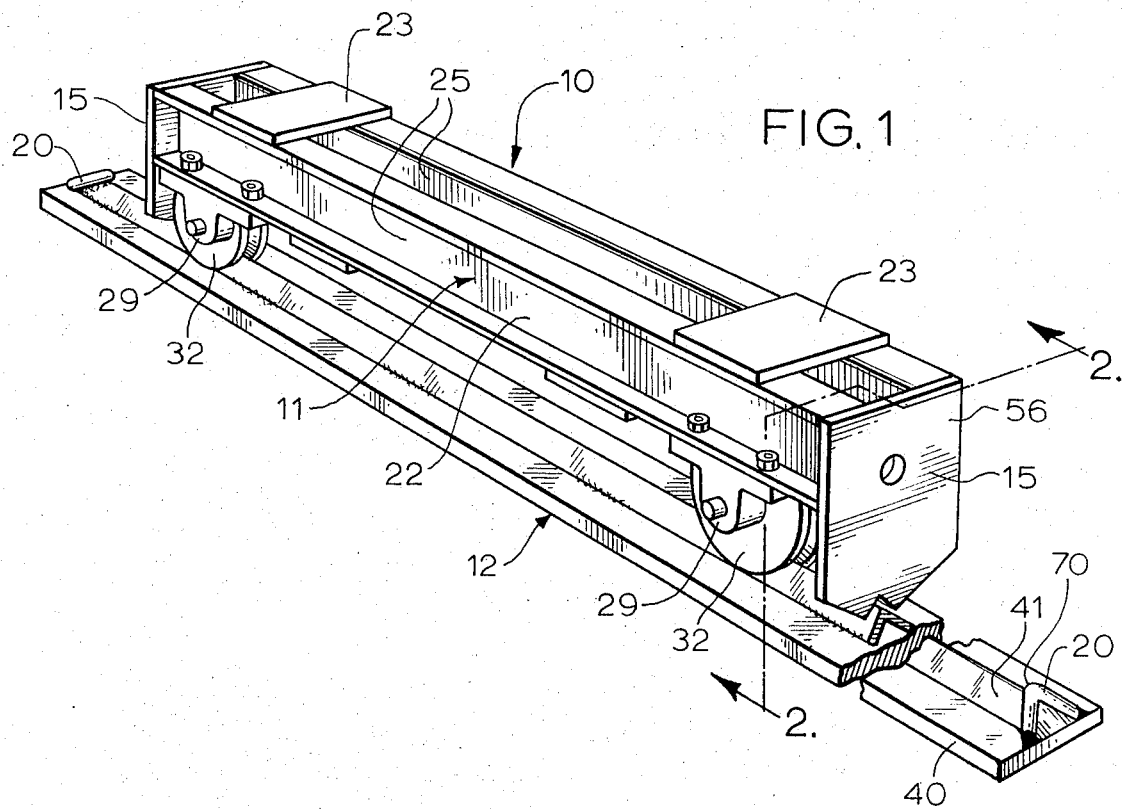
FIG. 1 is a perspective view of a portion of a carriage and track combination incorporating a wheel guard and travel stop arrangement embodying features of the arrangement, with parts broken away.

Turning now to the drawing, and particularly to FIG. 1, a portion of a vehicle washing device embodying features of the invention is illustrated generally at 10. The device 10 includes a carriage base frame 11, only half of which is shown, the other half being substantially identical, and one of the two tracks 12 on which the frame 11 rides. The frame 11 mounts car washing equipment of the type shown in the aforementioned Bevier patent. Since it forms no part of the present invention, it is not illustrated here.

Each side of the frame 11 mounts a pair of wheel guards 15 constructed according to the present invention. Since only one-half of the carriage frame 11 is illustrated, only two wheel guards 15 are shown, of course. It should be understood that identical wheel guards 15 are provided on the opposite side of the frame 11. The wheel guards 15 cooperate with the track 12 to prevent the carriage 11 from inadvertently rolling over the operator's foot, for example, or rolling over refuse or debris and possibly becoming derailed.

As the carriage 11 moves back and forth on the tracks 12 in washing a vehicle, for example, it reaches predetermined travel limits at each end of the parallel tracks 12. These are established by wheel stops 20 mounted on each end of each of the tracks 12. The wheel stops 20 are engaged by corresponding wheel guards 15 to stop the carriage.

Figure 2:
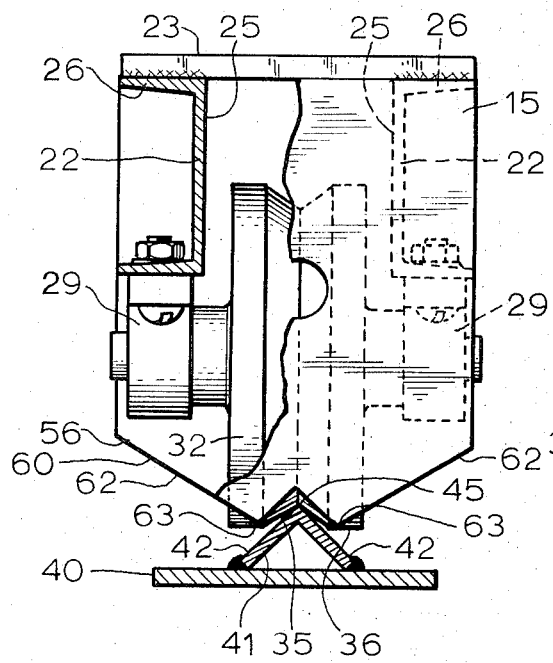
FIG. 2 is a sectional view taken along line 2—2 of FIG. 1.
Figure 3:
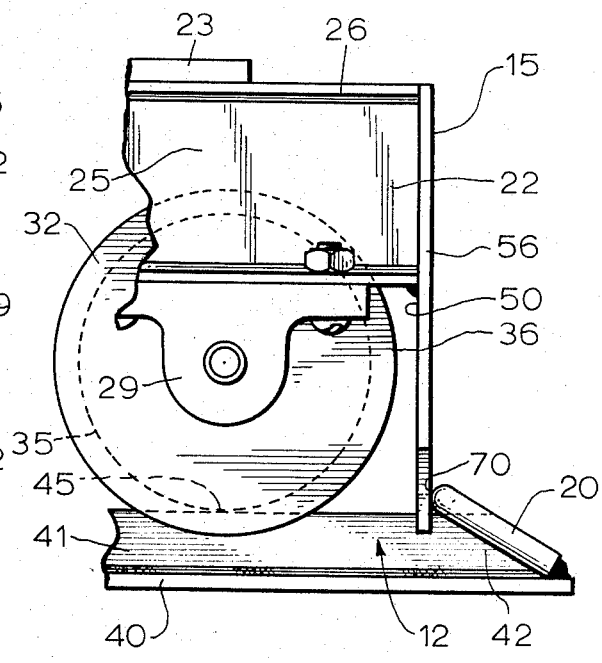
FIG. 3 is an enlarged side elevational view of the wheel guard and travel stop arrangment.

Referring now to FIGS. 2 and 3, as well as to FIG. 1, the carriage frame 11 comprises a pair of identical side sections 22, only one of which is shown extending parallel to each other. Each side frame section 22 comprises a longitudinally extending pair of stringers 25 in the form of steel channels. The channels 25 are connected by steel plates 23 welded to channel flanges 26. The side sections 22 are joined by conventional framework, not shown.

At each end of each of the stringers 25 a pillow block 29 is bolted to the lower flange 30 of the channel member. Journalled between each pair of opposed pillow blocks 29 is a carriage wheel 32.

Each of the four carriage wheels 32 has a Vee-shaped groove 35 formed around its annular outer surface 36. The groove 35 is, in the case of the wheel 32, centered transversely of the wheel surface 36, as illustrated best in FIG. 2. The wheels 32 are adapted to roll on the tracks 12 in a manner hereinafter described.

Each track 12 comprises a base plate 40 to which an inverted Vee-shaped angle member 41 is welded. In conventional fashion, the flanges 42 of the angle iron 41 extend at a 90° angle to each other and it is their longitudinally extending free edges which are welded to the upper surface of the base plate 40. As expected, the Vee-shaped groove 35 of each wheel 32 rides on the apex 45 of the inverted Vee-shaped angle member 41, substantially in line contact therewith. Relatively frictionless travel of the carriage 10 on the track 20 is provided.

As seen in FIG. 3, each wheel 32 is mounted on the corresponding stringers 25 immediately adjacent the respective ends of the paired stringers. The wheels 32 are positioned so that the annular periphery 36 of each wheel extends to a point immediately adjacent, but short of the free end 50 of corresponding stringers 25. Mounted on these free ends 50 of each pair of stringers 25 and, accordingly, immediately adjacent each wheel 32 on the carriage 10 is the wheel guard 15.

Each of these guards 15 is a plate 56 fabricated of ⅜ inch steel. It is generally rectangular in plan configuration, as best seen in FIG. 2, and extends transversely across the longitudinally extending stringer channels 25 to their outermost width.

According to the invention, the lower edge surface 60 of each plate 56 is irregularly shaped, including a center segment 61 having an inverted Vee-shape with an included angle of 90° and a pair of upwardly inclined outer segments 62 which intersect the sides of the inverted Vee segment 61 at lower apexes 63.

Each guard plate 56 is positioned so that the edge surface 60 in the inverted Vee-shaped center segment 61 defines a ¼ inch to ⅜ inch gap with the outer surface of the flanges 42 on the track angle member 41. The lower apexes 63 on the plate 56 at each side of the track 41 terminate at a point horizontally aligned with the annular surface 36 on the wheel 32 at its lowermost point.

The two outermost segments 62 of the lower edge surface on the plate 56 are inclined upwardly, as has been pointed out. They define an angle of 100° to 110° with the base plate 40 of the track. Accordingly, they tend not to catch objects which are clearly outside of the lateral scope of travel of the wheels 32 on the corresponding tracks 41.

Turning now to the stop 20 on each end of a corresponding track 12, they are obviously four in number. Only two stops 20 are illustrated, as has been pointed out. Each stop 20 comprises an inverted, Vee-shaped steel bar fabricated of ½ inch round bar stock.

Each bar stop 20 is 6 inches long and has an included angle of less than 90°. Accordingly, it lies flush against the flange 42 surfaces of a corresponding angle member 41 in the manner illustrated in FIG. 3; i.e., inclined toward the carriage frame 11 at an angle to the horizontal of approximately 30°. The stops 20 are welded to the angle members 41 in this position. As will be seen, the ends of the track are cut to the same angle as the carriage wheel stops 20 are inclined; i.e., 30°. This obviates a potential source of catching foreign objects or tripping an operator, for example.

When the device 10 reaches either of its opposite travel limits corresponding pairs of stop plates 56 engage the apexes 70 of the bar stops 20 in question. Because of the angle of inclination of the bar stops 20, they absorb shock without tending to pull off the tracks.

Because the lower surface apexes 63 of the stop plate coincide with the wheel 32 surfaces, they wipe any potentially interferring object away in advance of the wheel.

While the embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A wheel guard and travel stop arrangement for the carriage of a car washing device or the like, comprising:
   a. a carriage frame having a front wheel and a rear wheel,
   b. an elongated track on which said carriage frame is seated with said wheels supported by a load bearing member of said track for rolling movement thereon,
   c. a wheel guard plate mounted on said carriage frame over said track adjacent each of said wheels,
   d. each of said wheel guard plates having a lower surface with a segment thereof substantially complimentary in shape to the cross-sectional configuration of the load bearing member of the track and spaced a short distance therefrom,
   e. each of said wheel guard plates also having lower surface segments which bracket said complimentarily shaped lower surface segment and are inclined upwardly therefrom to substantially avoid engagement with foreign objects outside the lateral scope of the wheels, and
   f. stop means on each end of said track for engagement by a corresponding guard plate to limit travel of the carriage in both directions.

2. A wheel guard and travel stop arrangement for the carriage of a car washing device or the like, comprising:
   a. a carriage frame having a front wheel and a rear wheel,
   b. an elongated track on which said carriage frame is seated with said wheels supported by a load bearing member of said track for rolling movement thereon,
   c. said load bearing member of said track having an inverted Vee-shape in cross-sectional configuration,
   d. a wheel guard plate mounted on said carriage frame over said track adjacent each of said wheels,
   e. each of said wheel guard plates having a lower surface with a segment thereof substantially complimentary in shape with the cross-sectional configuration of the load bearing member of the track and spaced a short distance therefrom,
   f. each of said wheel guard plates also having lower surface segments which bracket said complimentarily shaped lower surface segment and are inclined upwardly therefrom to substantially avoid engagement with foreign objects outside the lateral scope of the wheels,
   g. stop means on each end of said track for engagement by a corresponding guard plate to limit travel of the carriage in both directions,
   h. each of said stop means comprising a short piece of metal bar stock having a generally circular crosssectional configuration,
   i. said bar stock being bent into a Vee-shaped configuration having an interior angle less than the exterior angle of said inverted Vee-shaped track whereby said bar stock lies flush against said track inclined toward the carriage frame.

3. The wheel guard and travel stop arrangement of claim 2 further characterized in that:
   a. the ends of said track are cut to approximately the same angle as the angle of inclination of said bar stock.

4. The wheel guard and travel stop arrangement of claim 2 further characterized in that:
   a. said bar stock is inclined at an angle of approximately 30°.

5. A wheel guard and travel stop arrangement for the carriage of a car washing device or the like, comprising:
   a. a carriage frame having a front wheel and a rear wheel,
   b. an elongated track on which said carriage frame is seated with said wheel supported by a load bearing member of said track for rolling movement thereon,
   c. the load bearing member of said track having an inverted Vee-shape in cross-sectional configuration, d. a wheel guard plate mounted on said carriage frame over said track adjacent each of said wheels, e. each of said wheel guard plates having a lower surface with a segment thereof substantially complimentary in shape to the cross-sectional configuration of the load bearing member of the track and spaced a short distance therefrom, and f. stop means on each end of said track for engagement by a corresponding guard plate to limit travel of the carriage in both directions, g. each of said stop means comprising a short piece of metal bar stock having a generally circular crosssectional configuration, h. said bar stock being bent into a Vee-shaped configuration having an interior angle less than the exterior angle of said inverted Vee-shaped track whereby said bar stock lies flush against said track inclined toward the carriage frame.

* * * * *